United States Patent [19]

Heidingher et al.

[11] 4,336,178

[45] Jun. 22, 1982

[54] PROCESS FOR PREPARING ABRASION AND CORROSION RESISTANT MATERIAL

[75] Inventors: Alexandru Heidingher; Ioan Sinko, both of Baia Mare, Romania

[73] Assignee: Centrala Minereurilor si Metalurgiei, Neferoase Baia Mare, Baia Mare, Romania

[21] Appl. No.: 192,273

[22] Filed: Sep. 30, 1980

Related U.S. Application Data

[63] Continuation-in-part of Ser. No. 68,858, Aug. 21, 1979, abandoned, which is a continuation of Ser. No. 934,935, Aug. 18, 1978, abandoned, which is a continuation of Ser. No. 762,223, Jan. 24, 1977, abandoned.

[30] Foreign Application Priority Data

Feb. 2, 1976 [RO] Romania .................................. 84675

[51] Int. Cl.$^3$ ............................................. C08L 63/00

[52] U.S. Cl. .................................. 523/206; 106/14.44; 523/427; 523/457; 523/220

[58] Field of Search ................. 106/14.44; 260/37 EP

[56] References Cited

U.S. PATENT DOCUMENTS

| | | | |
|---|---|---|---|
| 2,682,515 | 6/1954 | Naps ............................. | 260/830 TW |
| 2,735,829 | 2/1956 | Wiles et al. .................. | 260/830 TW |
| 2,866,768 | 12/1958 | Bolstad ........................ | 260/830 TW |
| 3,102,011 | 8/1963 | Bellinger ...................... | 51/298 |

*Primary Examiner*—Lorenzo B. Hayes
*Attorney, Agent, or Firm*—Ladas & Parry

[57] ABSTRACT

A process for preparing a corrosion and abrasion resistant material comprises a binder of two epoxy resins of different molecular weight and a hardener; and an erosion resistant component consisting essentially of Al$_2$O$_3$, SiC and spun glass.

1 Claim, No Drawings

PROCESS FOR PREPARING ABRASION AND CORROSION RESISTANT MATERIAL

The application is a continuation-in-part of application No. 68,858, now abandoned filed Aug. 21, 1979 which is a continuation of application No. 934,935 filed Aug. 18, 1978 now abandoned, and which is a continuation of application No. 762,223 filed Jan. 24, 1977 and now abandoned.

FIELD OF THE INVENTION

The present invention relates to a material resistant to abrasion and chemical corrosion which may be utilized in the manufacture of machinery such as engines, and to a process for the preparation of said material.

Description of the Prior Art

It is known that industrial equipment which comes in contact with fluids or with suspensions that are strongly erosive and/or corrosive, i.e. equipment such a pumps, flotation cells, agitators etc., wears out very quickly, sometimes only after some hours of operation, making such equipment expensive to operate.

The prolongation of the running life of such equipment is commonly accomplished by protecting it through rubberizing.

This method cannot be used in all cases, because of the difficulty in rubberizing, and also because of the low mechanical strength of the rubber.

Other known materials utilized for the same purpose are epoxy resins in combination with various abrasion resistant ingredients. These materials present disadvantages in having low mechanical strength.

At the same time, such known materials present difficulties because of a rapid increase in viscosity which occurs and which interferes with the casting operation in the mold.

These disadvantages are overcome in accordance with the present invention in which two types of epoxy resins are combined with selected fillers to form an abrasion and corrosion resistant material of unusual properties for manufacturing the wearing parts of equipment such as impellers.

Bellinger U.S. Pat. No. 3,102,011 discloses tumbling chips, formed from abrasive particles mixed with glass fibers and a thermosetting resin. The tumbling chips are used for a purpose different from that presently disclosed, and they are formed from a different selection of components. It is stated in said U.S. Pat. No. 3,102,011 that the binder is soft so that it wears down in use to expose the abrasive particles. Thus, it is believed that such material would not find use as does the present material, which is highly useful as wear-resistant material for structural parts.

Naps U.S. Pat. Nos. 2,682,515, Wiles et al. 2,735,829 and Bolstad 2,866,768 disclose epoxy containing compositions having a utility different from that of the present invention, and being concerned with adhesives or molding compositions. Reference is also made to background publications of interest, namely U.S. Pat. No. 3,751,326 and Chemical Abstracts Vol. 82 (1975), 87200 e and 126644 z.

SUMMARY OF THE INVENTION

The invention relates to an abrasion and corrosion resistant material formed from 80-85% by weight of an erosion resistant component consisting essentially of a mixture of $Al_2O_3$ and $SiC$ in a weight ratio of 1:2 each having a particle size below 5 mm; 0.5–3% by weight of a filler material consisting essentially of spun glass having a fiber length of between 3 and 5 mm; and from 15–20% by weight of a binder formed from two epoxy resins, each of said resins being formed from epichlorohydrin and 2,2-bis-parahydroxyphenylpropane, and having a molecular weight between 350 and 1400, but each having a different molecular weight, in a ratio of 1:2 by weight, and a phthalic anhydride hardener.

The invention also concerns a process for preparing said abrasion and corrosion resistant material, comprising mixing two epoxy resins at an elevated temperature up to about 120° C., each of said resins being formed from epichlorohydrin and 2,2-bis-parahydroxyphenyl propane, and having a molecular weight between 350 and 1400, but each having a different molecular weight, in a ratio of 1:2 by weight, and adding a phthalic anhydride hardener to form a binder, adding a prewet erosion resistant component consisting essentially of a mixture of $Al_2O_3$ and $SiC$ in a weight ratio of 1:2 each having a particle size below 5 mm; wherein the weight of said mixture is 80–85% of the weight of the final product, combined with spun glass having a fiber length of between 3 and 5 mm, wherein the weight of said spun glass is 0.5–3% of the weight of the final product, said filler material having been prewet with a solution of binder in acetone; homogenizing said binder and said prewet filler material; and heating said homogenized material at a temperature of up to about 160° C. for about 1–5 hours.

DESCRIPTION OF THE PREFERRED EMBODIMENTS

The material according to the present invention, owing to its remarkable anticorrosive properties and its mechanical durability may be utilized in machine construction and, for manufacturing wearing parts of various equipment especially in the ore treatment industry, such as impellers and stators of centrifugal pumps; impellers, stators and liners for flotation cells; hydrocyclones; liners for gangue carrying pipes; cocks etc. On the base of results indrustrially obtained, the anticorrosive properties of the material are as follows: when used in the form of impellers of centrifugal pumps which pump the ore suspension in non-ferrous ore treating plants, that were run under the same conditions as other commonly used pumps, the impellers made with the material of the present invention were usable for a duration 15–20 times as long as those manufactured from manganese steel and 3–4 times as long as rubber-coated impellers.

The material according to the present invention is resistant against corrosion by HCl, $H_2SO_4$, HF media and acetic acid, in any concentration and up to 80° C. temperature, as well as by dilute $HNO_3$ and $H_3PO_4$ media. It is also durable in a concentrated alkaline medium at ambient temperatures and in a dilute alkaline medium up to 60° C. temperature.

The use of material in accordance with the present invention for wearing parts presents the following advantages:

it permits construction of pieces of any size and complexity;

the pieces are not metallically armored;

the material also can be used as a coating or a covering, instead of as a molded or cast article;

the use of the present material enables the production of articles at low initial costs.

Manufacturing of erosion and corrosion resistant liners on metallic agitators may be accomplished by applying and molding the casting mass on the preheated inner surface of the vessel. For this purpose the vessel is kept in a horizontal position, its wall is preheated, the casting mass is applied and is thermally treated with usual heating devices.

The following examples are illustrative of the invention, but should not be construed as a limitation thereof:

EXAMPLE 1

333 g $Al_2O_3$ Having a particle size between 0.3–0.6 mm, 660 g SiC having a particle size between 0.6–1 mm and 5 g spun glass with a fiber length of 2–5 mm are mixed. The mixture is prewet with 200 cc of a solution of 7% by weight of the below-described binder in acetone, by continuous mixing after which it is allowed to remain until the acetone solvent is completely evaporated. If desired, solvent removal can also be accomplished by heating.

The binder is formed by mixing two epoxy resins, in a weight ratio of 1:2, each having a different degree of polycondensation and having a molecular weight between 350 and 1400, both prepared from epichlorohydrin and 2,2-bis-parahydroxyphenylpropane, and adding an effective amount of a phthalic anhydride hardener. The two resins are mixed at 120° C. and the phthalic anhydride is added with mixing until complete dissolution is achieved.

For preparation of the abrasion and corrosion resistant material, the prewet filler is pre-heated, with mixing, at approximately 100° C. and it is added to 170 g of binder heated to 120° C., while continuing slow mixing until the product is homogenized. In the homogenized state, the resulting paste is cast in pre-heated molds at 130° C., and is then heated at a temperature of 160° C. for 1–5 hours, after which the cast piece is relieved of stress through slow cooling (3–5 hours, as a function of size).

EXAMPLE 2

Casting material used for spare parts manufacture of equipment useful for operation in difficult conditions of erosion and acid corrosion, under normal temperature conditions is prepared.

Typical uses for equipment of this kind are for pump impellers and flotation cell impellers used in nonferrous ore treating plants. Such equipment is used to transport an aqueous suspension which is very erosive and contains 300–400 g/l of a solid phase in particle form ranging 10–150 mm in diameter, of which more than 90% usually is composed of quartz. As the hardness of quartz is 7 on the Mohs scale, it is the main cause of suspension erosion.

In order to resist this high erosion stress, the erosion resistant material of the present invention is molded at a pressure of 3–3.5 $kg/dm^3$ to impart maximum mechanical strength and a hardness of 9 on the Mohs scale, and is thus harder than the material which is the principal cause of erosion.

2:1 Preparation of the binder component

The binder is prepared with two epoxy resins having different molecular weights, which are formed from epichlorohydrin and 2,2-bis-parahydroxyphenyl propane. The components of the binder are as follows:

50% Of an epoxy resin with a molecular weight of 340, which is a viscous liquid at normal temperature ("Dinox" 040 or "Epikote" 828 may be used);

50% of an epoxy resin with a molecular weight of 650 and having a melting point between 65° and 80° C. ("Dinox" 110 or "Epon" 100 L are suitable);

an amount of phthalic anhydride as hardener, the amount being sufficient for hardening the particular quantity of the two resins which are used.

The epoxy resins are mixed at a temperature of about 80°–120° C. and the phthalic anhydride is dissolved in the mixture by continuous stirring.

The binding component has a limited stability, about 30 minutes at the temperature of preparation, following which its viscosity is greatly increased and the hardening process begins. It can be preserved for 5–8 hours as flakes by casting and sudden cooling in a thin layer on a metallic surface. Part of the binding component in the form of flakes is dissolved in acetone for use in the prewetting step.

2.2: Preparation of the prewet solution

A portion of the binder in the form of flakes, prepared according to 2.1 is dissolved in acetone by continuous stirring at room temperature to form a solution of 7% by weight binder in acetone solvent.

2.3: Preparation of the erosion resistant component $Al_2O_3$ (corundum) and SiC (silicon carbide) are mixed in a weight ratio of 1:1, both of the components having the following particulate composition:

| | |
|---|---|
| 4–5 mm diameter | 35% |
| 4–2.5 mm diameter | 25% |
| 2.5–1 mm diameter | 20% |
| 1–0.1 mm diameter | 15% |
| less than 0.1 mm diameter | 5% |

Spun glass having a fiber length of about 5 mm and thickness of about 0.1 mm is incorporated into the mixture in an amount of 3% by weight, as an intergranular filler component.

2.4: Preparation of the casting mass

In order to obtain 1 kg of casting mass, 820 grams of the erosion resistant component (obtained according to 2.3) is mixed with 200 cc of the prewet solution (obtained according to 2.2) with continuous stirring. Acetone is eliminated by heating at a temperature of 40° C. with continuous stirring under vacuum.

After the total removal of acetone, the erosion resistant component is heated at a temperature of 90°–100° C. and 166 g of the binding component (prepared as at 2.1) is added to it with continuous stirring and the product is heated to about 100° C. The casting mass is homogenized by mixing until the intergranular filler component is uniformly dispersed.

2.5: Production of the erosion and corrosion resistant material

For this purpose the casting mass prepared as in 2.4 is charged into metallic molds preheated to 110°–130° C. It is pressed at 50–120 $kg/cm^2$ pressure and heated at 130°–160° C. at which temperature it is maintained for 3–5 hours (depending upon the size of the molded piece and the temperature).

In order to be able to remove the manufactured cast piece, the preheated mold is treated before the charge with a stripping agent (silicon oil).

Impellers of centrifugal pumps prepared in accordance with this example wear out uniformly as compared to impellers made of hard steel which do not wear out uniformly, or as compared with rubberized impellers which wear out by cutting type destruction of the rubber layer.

Such impellers of pumps made in accordance with the present example can be used 15-20 times as long as those made of manganese steel, 2.5-3 times as long as those made of steel with a 600° Brinell hardness and 4-5 times as long as rubber-coated impellers.

EXAMPLE 3

Casting material useful for manufacturing equipment which is erosion resistant and acid corrosion resistant at temperatures up to 80° C., and alkali corrosion resistant at temperatures up to 60° C. is prepared.

Typical uses for equipment of this kind are for the stators of centrifugal pumps or agitator liners used in installations for alumina manufacture or used in installations for non-ferrous hydrometallurgy.

3.1: Preparation of the binder component

The composition described in Example 2.1 is modified as follows:

15% epoxy resin with a molecular weight of 340
85% epoxy resin with a molecular weight of 650
30% of phthalic anhydride as hardener, the amount being based on the total weight of the two resins.

3.2: Preparation of the prewet solution

A solution of 7% by weight of the binder according to 3.1 above in acetone solution is prepared as described in Example 2.2.

3.3: Preparation of the erosion resistant component

Al$_2$O$_3$ (corundum) and SiC (silicon carbide) are mixed in a weight ratio of 1:2 both of the components having the following particulate composition:

| | |
|---|---|
| 4–2.5 mm diameter | 35% |
| 2.5–1 mm diameter | 30% |
| 1–0.1 mm diameter | 30% |
| less than 0.1 mm diameter | 5% |

An intergranular spun glass filler component is incorporated into the mixture in an amount of 2-3% by weight, the spun glass having dimensions as described in Example 2.3.

3.4: Preparation of the prewet casting mass

In order to obtain 1 kg casting mass, 300 g of the erosion resistant component (obtained according to 3.3) is heated to 90°-100° C. and 200 g of the binder component (preheated to 100° C. and prepared according to 3.1) is added with continuous stirring. The mixture is homogenized by continuous stirring until the filler component is uniformly dispersed.

3.5: Preparation of the corrosion and erosion resistant material

The manufacturing of erosion and corrosion resistant pump stators is accomplished as described in Example 2.5.

What is claimed is:

1. A process for preparing an abrasion and corrosion resistant material, comprising mixing two epoxy resins having different molecular weights at an elevated temperature of 80° C. up to about 120° C., each of said resins being formed from epichlorohydrin and 2,2-bis-parahydroxyphenyl propane, have a molecular weight between 350 and 1400, and mixed in a ratio of 1:2 by weight, and adding phthalic anhydride hardener to form a binder; adding to said binder a prewet erosion resistant component consisting essentially of a mixture of 80-85% by weight of the final product of Al$_2$O$_3$ and SiC in a weight ratio of 1:2 each having a particle size below 5 mm; and 0.5-3% by weight of the final product of spun glass having a fiber length of between 3 and 5 mm, said component having been prewet with a solution of said binder in acetone; homogenizing said binder and said prewet component; and heating said homogenized material at a temperature of 130° C. up to about 160° C. for about 1-5 hours.

* * * * *